United States Patent
Imao

(10) Patent No.: US 7,969,977 B2
(45) Date of Patent: Jun. 28, 2011

(54) PROCESSING APPARATUS AND METHOD FOR PROCESSING IP PACKETS

(75) Inventor: Eiji Imao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 12/394,435

(22) Filed: Feb. 27, 2009

(65) Prior Publication Data

US 2009/0225757 A1    Sep. 10, 2009

(30) Foreign Application Priority Data

Mar. 7, 2008  (JP) ................................ 2008-058703

(51) Int. Cl.
*H04L 12/54* (2006.01)

(52) U.S. Cl. ......................... 370/389; 370/392; 370/474

(58) Field of Classification Search .................. 370/230, 370/230.1, 231, 235, 389, 392, 400, 401, 370/474, 476; 709/232, 245
See application file for complete search history.

(56) References Cited

U.S. PATENT DOCUMENTS

| | | | | |
|---|---|---|---|---|
| 7,245,615 B1 * | 7/2007 | Potter et al. | .................... | 370/389 |
| 7,328,277 B2 * | 2/2008 | Hussey et al. | ................. | 709/238 |
| 2004/0042483 A1 * | 3/2004 | Elzur et al. | ..................... | 370/463 |
| 2005/0281287 A1 * | 12/2005 | Niinomi et al. | ............... | 370/474 |
| 2006/0174058 A1 * | 8/2006 | Sikdar et al. | .................. | 711/108 |
| 2006/0215691 A1 * | 9/2006 | Kobayashi et al. | ........... | 370/466 |
| 2006/0274789 A1 * | 12/2006 | Pong | ................................ | 370/469 |
| 2007/0165661 A1 * | 7/2007 | Kyusojin | ....................... | 370/412 |
| 2008/0205405 A1 * | 8/2008 | Corl et al. | ..................... | 370/392 |
| 2009/0067431 A1 * | 3/2009 | Huang et al. | .................. | 370/394 |
| 2009/0073884 A1 * | 3/2009 | Kodama et al. | ............... | 370/235 |
| 2009/0161568 A1 * | 6/2009 | Kastner | ........................ | 370/252 |

FOREIGN PATENT DOCUMENTS

JP   2007-274056 A   10/2007

* cited by examiner

*Primary Examiner* — Pankaj Kumar
*Assistant Examiner* — Duc T Duong
(74) *Attorney, Agent, or Firm* — Fitzpatrick, Cella, Harper & Scinto

(57) ABSTRACT

A processing apparatus that processes received IP packets comprises a control unit and a processing unit, wherein the control unit controls a first memory. While data indicating a reception state of fragmented IP packets is transferred from a second memory to the first memory, the processing unit performs processing for determining whether a header of an IP packet has been properly received. The processing unit instructs the control unit to update the data stored in the first memory depending on a result of the processing for determining whether the header of the IP packet has been properly received.

8 Claims, 12 Drawing Sheets

PROCESSING APPARATUS AND METHOD FOR PROCESSING IP PACKETS

BACKGROUND OF THE INVENTION

1. Field of the Invention

The present invention relates to processing apparatuses and methods for processing IP (Internet Protocol) packets.

2. Description of the Related Art

In protocol processing, one type of processing that involves a large amount of processor processing is IP reassembly. In IP communications, an IP packet is transmitted by fragmenting it into a plurality of IP packets at a sender or on a transmission path, and received by recovering the fragmented original packet at a receiver. The processing of transmitting an IP packet by fragmenting it into a plurality of IP packets is called IP fragmentation. The processing of receiving the fragmentary IP packets and recovering the original IP packet is called IP reassembly. Specifications for IP reassembly are available in RFC 791.

Two algorithms for IP reassembly are known, namely, a procedure described in RFC 791 and a procedure described in RFC 815. Herein, the former procedure will be introduced. It is to be noted that the former IP reassembly procedure will be herein referred to as a bitmap table scheme.

In IP reassembly according to the bitmap table scheme, a receiver prepares bit tables in which every 8 octets of payload data of a sender's IP packet are assigned to one bit. Since the maximum length of an IP datagram is 65535 octets, a prepared bit table requires a length of about 8 kilobits. While payload data of each arriving fragment packet is saved, the reception state of fragment data is managed by setting bits in the bit table corresponding to the offset position and length of the fragment data. Thereafter, when all the bits in the bit table corresponding to the payload length of the sender's IP packet are set, which means that data needed for reassembling the fragmented original IP packet has all been arrived, the IP reassembly processing is completed.

In recent years, network communications have rapidly become faster, and Ethernet® products compatible with gigabit networks have already been popular for consumer use. Further, the IEEE 802.3 working group is currently going to establish a standard that can achieve a transmission speed of 40 megabits/s or 100 megabits/s. With such speedups in network communications, applications using IP communications and the amount of transmitted and received data are both increasing. Therefore, load for communication protocol processing is increasingly imposed on communication terminal devices.

Conventionally, protocol processing for IP communications is often implemented in software called the TCP/IP (Transmission Control Protocol/Internet Protocol) protocol stack. Also in embedded devices having an IP communication capability, IP protocol processing is often software-implemented. However, small embedded devices are often equipped with a low operation frequency CPU, which is advantageous in terms of the manufacturing cost and the amount of power consumption. This increases the processor load for required software-implemented protocol processing.

Thus, it has become difficult with the conventional processing to achieve a high communication performance. A further problem is that sufficient CPU resources cannot be allocated to application processing due to the processing load for communication processing.

As a measure for these problems, a technique generally called TOE (TCP/IP Offload Engine) exists for reducing the communication processing load on the processor and realizing high-speed IP communications. This TOE is a technique for speeding up the TCP/IP protocol processing by using processing unit separate from the processor that executes applications.

In TOE, all or part of the protocol processing is often performed in hardware processing (an integrated circuit) to achieve a high speed. Implementations for embedded devices may include embodying TOE in an LSI and containing it in a chip.

In the above-described IP reassembly according to the bitmap table scheme, the size of a table required for accommodating the maximum packet size of an unfragmented IP packet is 1 Kbyte (8192 bits). Also, bit tables as many as the number of concurrent IP reassembly processes processed in parallel are necessary. As the number of received IP packets per unit time increases due to speedups in communications, the number of IP reassembly processes processed in parallel also increases, so that the memory size required for the bit tables increases.

To realize high-speed IP reassembly in hardware processing by the above-described TOE technique, it is desirable to form the bit tables in on-chip memory, which involves a small access delay. However, a large memory capacity that matches the number of processes processible in parallel is required, and the use of high-cost on-chip memory will increase the memory cost. On the contrary, small-capacity memory will pose a problem in that the number of processes processible in parallel is limited.

A conventional art for managing the arrival state of fragment data by using this bit data is Japanese Patent Laid-Open No. 2007-274056, for example. In Japanese Patent Laid-Open No. 2007-274056, the fragmentation size of IP fragments is limited to a small range to give an implicit fragment number to each fragment packet, so that management of the reception state of the fragment packets is simplified and a high speed is achieved.

In this method, since the size to which an IP packet is fragmented is predefined, the bit width for managing the reception state of fragment packets can be smaller than 8 Kbits. Therefore, the memory size required for IP reassembly can be reduced. However, this method is not suitable for performing IP reassembly of arbitrary-sized fragment packets because the fragmentation size is limited to the small range.

SUMMARY OF THE INVENTION

An object of the present invention is to speed up reassembly processing of fragmented IP packets and to reduce the memory cost required for parallel processing.

According to one aspect of the present invention, there is provided a processing apparatus that processes received IP packets comprising: a controller configured to control a first storage; and a processor configured to perform processing for determining whether a header of an IP packet has been properly received while data indicating a reception state of fragmented IP packets is transferred from a second storage to the first storage, and instruct the controller to update data stored in the first storage in accordance with a result of the processing for determining whether the header of the IP packet has been properly received.

According to another aspect of the present invention, there is provided a processing method for processing received IP packets comprising: performing, at a processor, processing for determining whether a header of an IP packet has been properly received while data indicating a reception state of fragmented IP packets is transferred from a second memory to a first memory; and updating, at a controller, the data stored in the first memory in accordance with a result of the processing for determining whether the header of the IP packet has been properly received.

Further features of the present invention will become apparent from the following description of exemplary embodiments (with reference to the attached drawings).

DESCRIPTION OF THE EMBODIMENTS

With reference to the drawings, the best mode for implementing the present invention will be described in detail below.

First Embodiment

Figure 1:
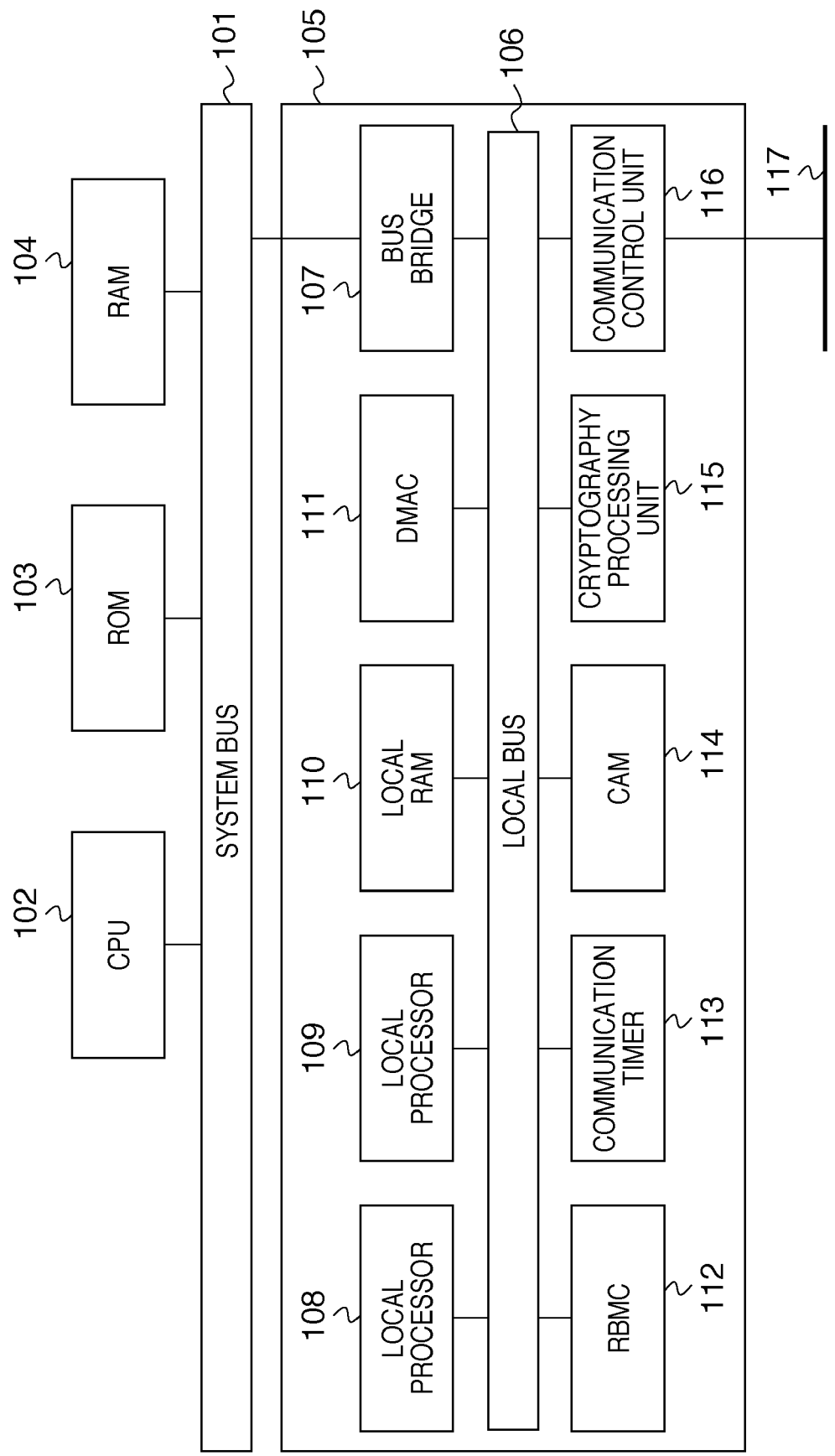
FIG. 1 is a block diagram showing an exemplary configuration of a network communication apparatus in a first embodiment.

FIG. 1 is a block diagram showing an exemplary configuration of a network communication apparatus in a first embodiment. As shown in FIG. 1, a CPU 102, a ROM 103, and a RAM 104 are connected to a system bus 101. The CPU 102 reads a system program stored in the ROM 103 into the RAM 104 and executes the system program. The RAM 104 is main memory used in executing the system program.

A block denoted by 105 is an IP protocol processing apparatus according to the present invention and is connected to the system bus 101. The IP protocol processing apparatus 105 performs TCP/IP protocol processing and data transmission and reception to and from a network 117 needed for communications in applications executed by the CPU 102.

In the IP protocol processing apparatus 105, a bus bridge circuit 107 connects an internal local bus 106 to the system bus 101 and allows data transfer between the local bus 106 and the system bus 101. The IP protocol processing apparatus 105 and the external system composed of the CPU 102, the ROM 103, and the RAM 104 are configured in such a manner that the respective bus circuits are connected with each other to perform input and output of communication data and control data through bus transfer.

Two local processors 108 and 109 for performing the TCP/IP protocol processing, a local RAM 110, and a DMA controller (DMAC) 111 for transferring data are also connected to the local bus 106. Further, a reassembly bitmap controller (RBMC) 112 that performs bit table processing for IP reassembly, and a communication timer 113 used for timer processing in the protocol processing are connected to the local bus 106. Still further, a CAM (Content Addressable Memory) 114 as associative memory for storing and retrieving various kinds of management information for the protocol processing is connected to the local bus 106. Still further, a cryptography processing unit 115 that performs computation processing for encryption/decryption needed in encrypted communication processing, and a communication control unit 116 that transmits and receives data to and from the network 117 are connected to the local bus 106.

The IP protocol processing apparatus 105 performs the IP protocol processing as parallel processing involving a plurality of processor processes. Further, the IP protocol processing apparatus 105 uses the hardware processing units 111 to 115 to perform packet transmission and reception according to the TCP/IP protocol, as well as transmission flow control, congestion control, communication error control, and processing according to encrypted-communication protocols such as IPsec and SSL/TLS.

A program executed by the local processors 108 and 109 is stored in the ROM 103 and copied into the local RAM 110 at power-on of the IP protocol processing apparatus 105. The local processors 108 and 109 read out the program from the local RAM 110 and execute it.

Although two local processors 108 and 109 are shown in FIG. 1, the number of processors that perform the software processing is not limited to two.

The DMAC 111 performs processing of transferring transmitted/received data and control data to and from memory devices and hardware modules inside or outside the IP protocol processing apparatus 105. The RBMC 112 performs bit operation processing on bit tables used in an IP reassembly algorithm according to the bitmap scheme (RFC 791), and transfers bit table data to and from the RAM 104.

The communication timer 113 is used in various kinds of timeout processing in the IP protocol processing, such as timeout period measurement in the IP reassembly, and time measurement needed for various timers for retransmission processing, acknowledgement transmission, and so on in TCP protocol communications. The cryptography processing unit 115 performs encryption/decryption computation processing that imposes a heavy processing load in processing according to encrypted-communication protocols such as IPSec and SSL (Secure Socket Layer)/TLS (Transport Layer Security).

The communication control unit 116 implements functions of performing MAC processing for the network 117 (transmission medium control processing) and frame data transmission and reception. The network 117 may be a wired network such as Ethernet® for example, but may be a wireless network, a fiber-optic network, or the like.

Figure 2:
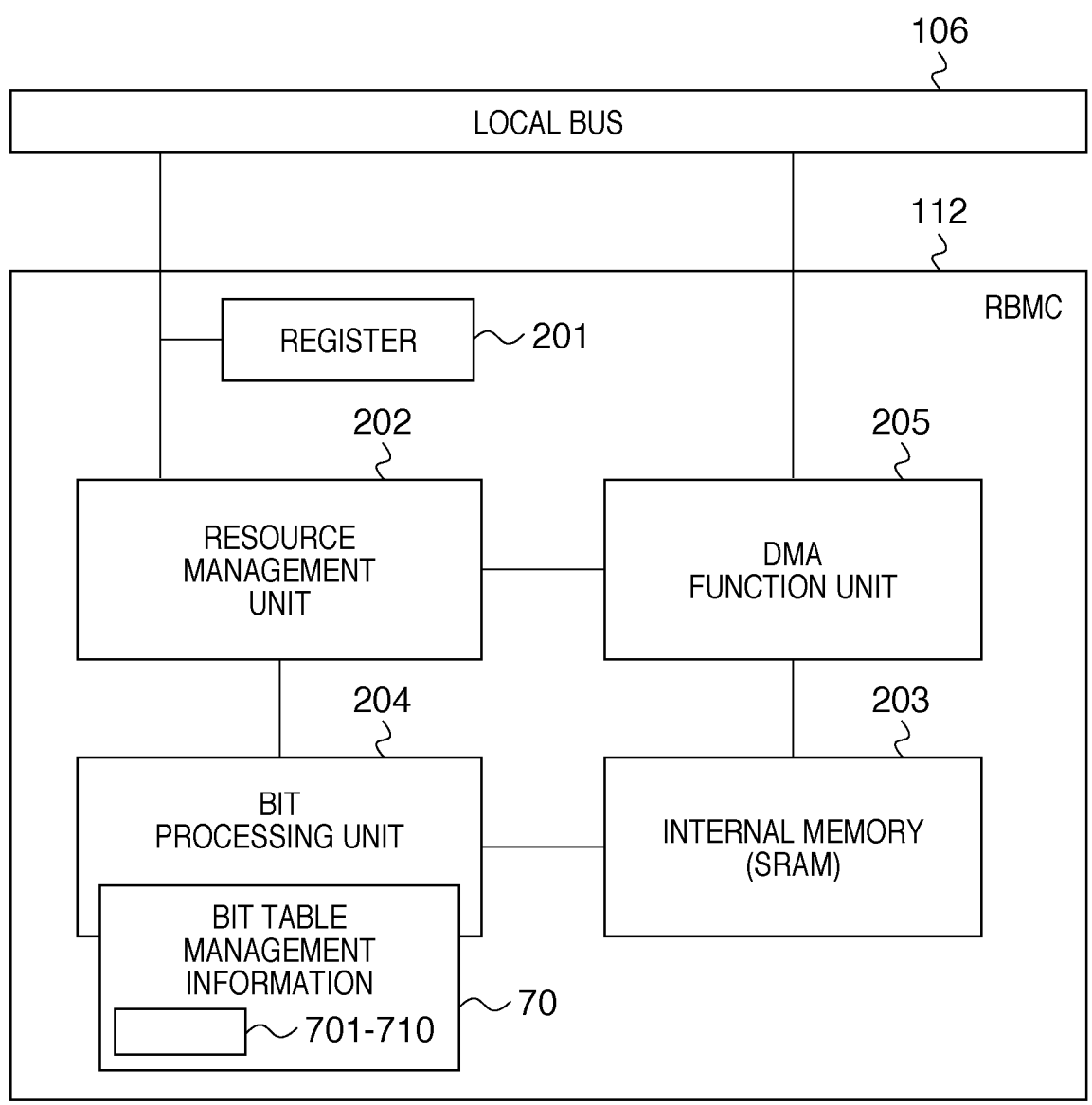
FIG. 2 is a block diagram showing an exemplary configuration of an RBMC in the first embodiment.

Now, an exemplary implementation of the RBMC 112 will be described with reference to FIG. 2. FIG. 2 is a block diagram showing an exemplary configuration of the RBMC in the first embodiment.

The RBMC 112 is composed of a register 201, a resource management unit 202, an internal memory (SRAM) 203, a bit processing unit 204, and a DMA function unit 205. The register 201 is a control interface for setting, startup, etc., of the RBMC 112, and it consists of a plurality of register sets.

The local processors 108 and 109 read from and write to the register 201 to set and control the RBMC 112.

The resource management unit 202 performs data management of a plurality of bit tables. Management information data is stored in the local RAM 110 shown in FIG. 1. The bit processing unit 204 performs bit operation processing on any range of bit table data stored in the internal memory 203. This bit operation processing includes, for a bit string of any length, setting all bits to 1, clearing all bits to 0, counting the number of bits having a value of 1, and counting the number of bits that has changed from 0 to 1 when all bits are set to 1.

The internal memory 203 is implemented as memory with a very small access delay in this example. The RBMC 112 temporarily stores, in the internal memory 203, bit table data on which the bit processing unit 204 performs the bit operation processing. In the bit operation processing by the bit processing unit 204, data is read from and written to the internal memory 203.

The DMA function unit 205 is controlled by the resource management unit 202 to transfer the bit table data between the internal memory 203 and memory residing outside the RBMC 112.

In the above configuration, bit tables for the IP reassembly are kept in the RAM 104. When the RBMC 112 performs the bit operation processing on a bit table, relevant bit table data is temporarily stored in the internal memory 203 and the bit operation processing is performed on the temporarily stored bit table data.

Here, the bit operation processing on a bit table in the IP reassembly will be described with reference to FIG. 3. In a bit table used in the IP reassembly, each bit starting with a first bit is mapped to each eight octets from the beginning of the payload of a fragmented original IP packet. That is, each bit is a flag that stores an indication whether or not the corresponding eight octets have been received in the IP reassembly. For example, in a bit table 301 shown in FIG. 3, bits with a value of 1 represent that the corresponding eight octets have already been received.

In the IP reassembly, for fragment data carried by a received fragment packet, its fragment offset and fragment size in the payload of an unfragmented IP packet can be obtained from the content of the IP header of the received fragment packet. Based on this information, each bit in a bit range corresponding to the received fragment data has "1" written thereto, which indicates that it has been received. Once a fragment packet of the last portion is received, the total length of the fragmented original IP packet can be obtained and the bit width required on the bit table is determined. Therefore, when a bit string corresponding to the payload length of the fragmented original IP packet is all filled with values 1, all fragment data that constitutes the fragmented original IP packet has been received.

Figure 3:
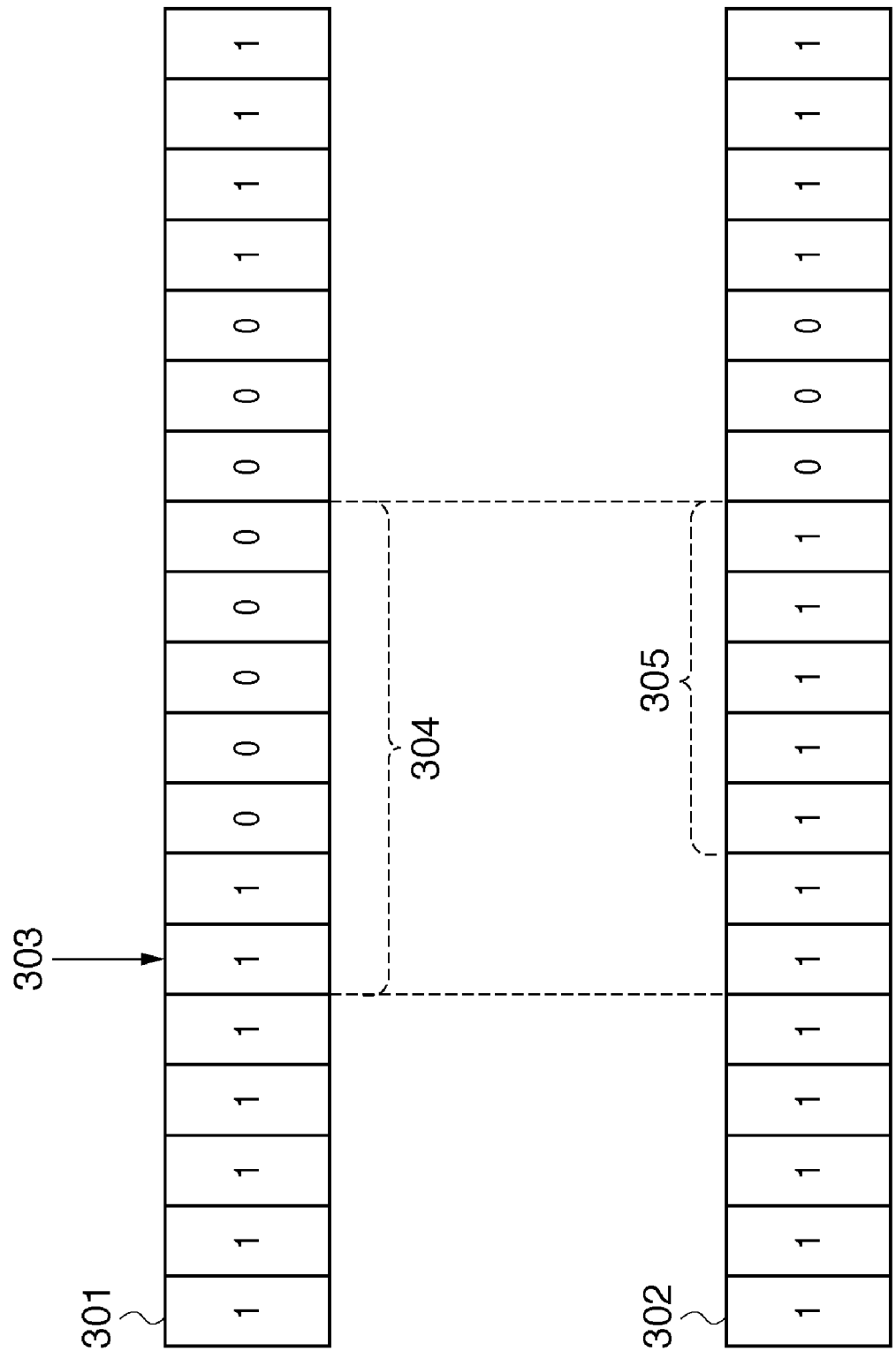
FIG. 3 is a diagram for describing bit operation processing on a bit table in IP reassembly.

In the example shown in FIG. 3, reference numeral 303 in the bit table 301 denotes the offset position of the received fragment data in the payload of the fragmented original IP packet, and reference numeral 304 denotes the bit width corresponding to the fragment data. The bit table here is a table for managing the reception state of the fragmented IP packet.

When the fragment data is received, the bit processing unit 204 writes "1" to each bit starting with the position 303 over the range 304. As a result, the bit data in 301 is updated as shown in 302. The portion denoted by 305 represents bits that have newly changed from 0 to 1. The bit processing unit 204 performs such bit operation processing.

The bit processing unit 204 also counts the number of bits that have their values changed from 0 to 1 and sets the size of newly received fragment data in the register 201 of the RBMC 112.

As described above, the bit processing unit 204 performs the bit operation processing on data in the internal memory 203 with a small access delay. Since this allows high-speed IP reassembly, SRAM may be implemented as the internal memory 203, for example.

However, if bit tables for all IP reassembly processes processed in parallel are placed in the internal memory 203 with a small access delay, a memory capacity corresponding to the number of IP reassembly processes processible in parallel will be required, and the memory cost will be significant.

Therefore, all bit tables are kept in the RAM 104, while only bit table data to be processed in the IP reassembly is copied and temporarily stored in the internal memory 203. This allows the memory cost for the internal memory 203 to be reduced.

In the first embodiment, an identifier referred to as an IP reassembly ID is assigned to each IP reassembly process processed in parallel, and managed in association with a bit table. Among the bit tables in the RAM 104, bit tables that are frequently subjected to the bit operation processing are temporarily stored in the internal memory 203.

Figure 4:
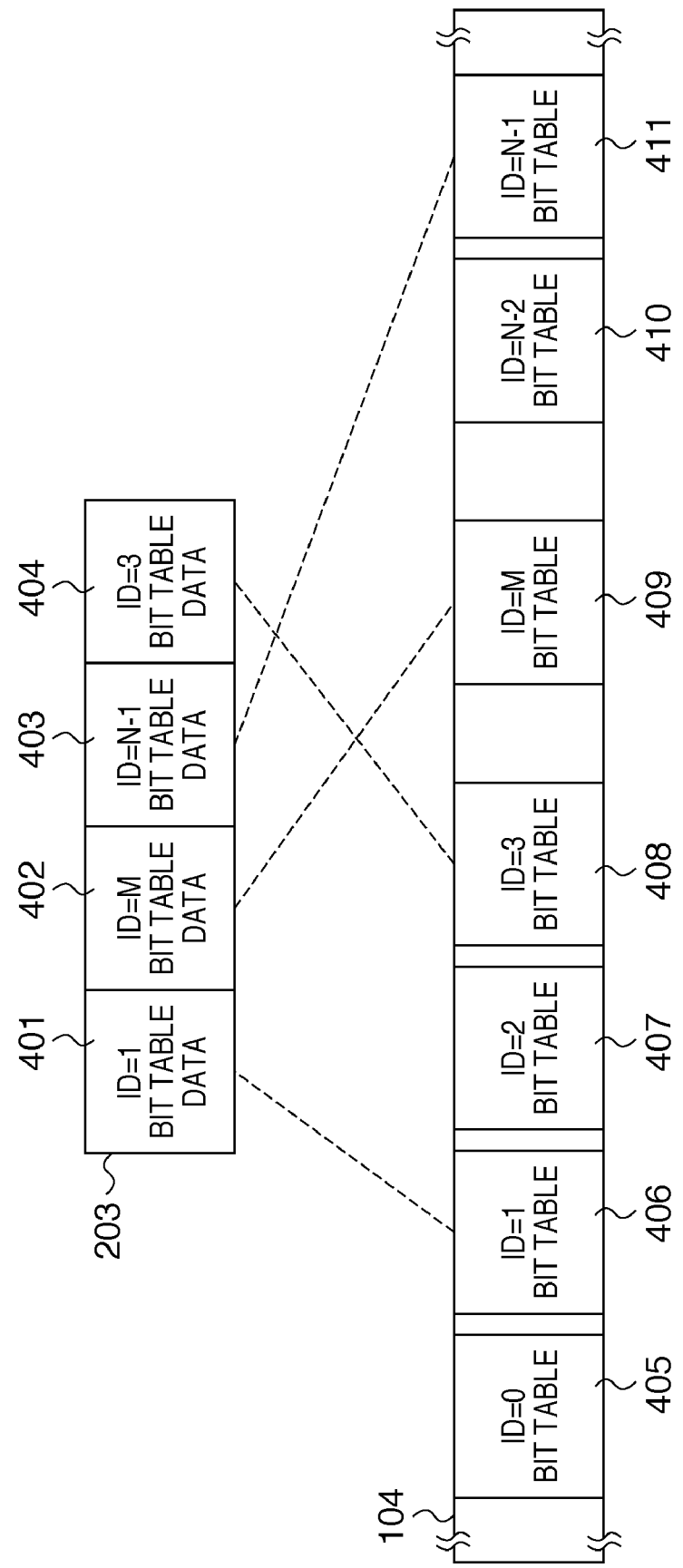
FIG. 4 is a diagram showing that bit tables for the IP reassembly are managed with IP reassembly IDs.

FIG. 4 is a diagram showing that the bit tables for the IP reassembly are managed with the IP reassembly IDs. This example shows that, at a certain point in time, N bit tables being processed are kept in the RAM 104 and four bit tables are temporarily stored in the internal memory 203.

As shown in FIG. 4, in the RAM 104, the N bit tables denoted by 405 to 411 are placed at any memory addresses. Among these bit tables, bit tables 406, 408, 409, and 411 with IP reassembly IDs 1, 3, M, and N-1 are temporarily stored at locations in the internal memory 203 denoted by 401, 402, 403, and 404.

That is, this data storage in the internal memory 203 employs the full associative approach on a bit table size basis. In the exemplary use of the internal memory 203 shown in FIG. 4, at a certain point in time, the bit tables with IP reassembly IDs 1, 3, M, and N-1 are temporarily placed in the internal memory 203. Therefore, if a fragment packet to be received next after this point in time corresponds to any of these IP reassembly processes, a bit table does not need to be transferred from the RAM 104 to the internal memory 203.

However, if a fragment packet corresponding to an IP reassembly process for which a bit table is not stored in the internal memory 203 is received, the bit table to be processed needs to be copied from the RAM 104 to the internal memory 203. Also, if the internal memory 203 has no space for storing the bit table, any of the temporarily stored bit tables needs to be written back to the RAM 104 so that the bit table to be processed next may be temporarily stored in a space made available.

Therefore, the resource management unit 202 in the RBMC 112 manages the bit tables on a reassembly ID basis.

Bit table management information 70 maintained by the resource management unit 202 for each IP reassembly ID includes the following items 701 to 710.

701: a reassembly ID
    702: a record of the processing time of the IP reassembly processed last in the IP reassembly process that uses this bit table
    703: a record of the time interval (arrival interval) from the last processed IP reassembly
    704: the memory address of the bit table in the RAM 104

705: a flag indicating whether or not the bit table is temporarily stored in the internal memory 203

Items 706 to 710 are parameters used when the bit table is temporarily stored in the internal memory 203.

706: the address of the bit table data in the internal memory 203

707: the size of the bit table data in the internal memory 203

708: a flag indicating whether the bit table data has been modified in the internal memory 203

709: the offset address that means the starting position of the modified bit range in the bit table 710: the data size indicating the modified range The management information about each bit table is stored in the local RAM 110 and updated by the resource management unit 202 of the RBMC 112.

When bit table data is transferred from the RAM 104 and stored in the internal memory 203, the resource management unit 202 checks the bit table management information 70 to determine whether or not a space is available for temporarily storing the bit table data. If no space is available, the resource management unit 202 compares each time interval 703 from the last processed IP reassembly in the bit table management information 70 and selects a bit table for an IP reassembly process with the longest arrival interval. The selected bit table has its data written back from the internal memory 203 to the RAM 104 to create an available area in the internal memory 203.

In this manner, if a bit table is not temporarily stored in the internal memory 203 in the IP reassembly, the bit table data is transferred from the RAM 104 and temporarily stored in the internal memory 203.

The data transfer between the internal memory 203 and the RAM 104 is performed by the DMA function unit 205 in the RBMC 112.

Figure 5:
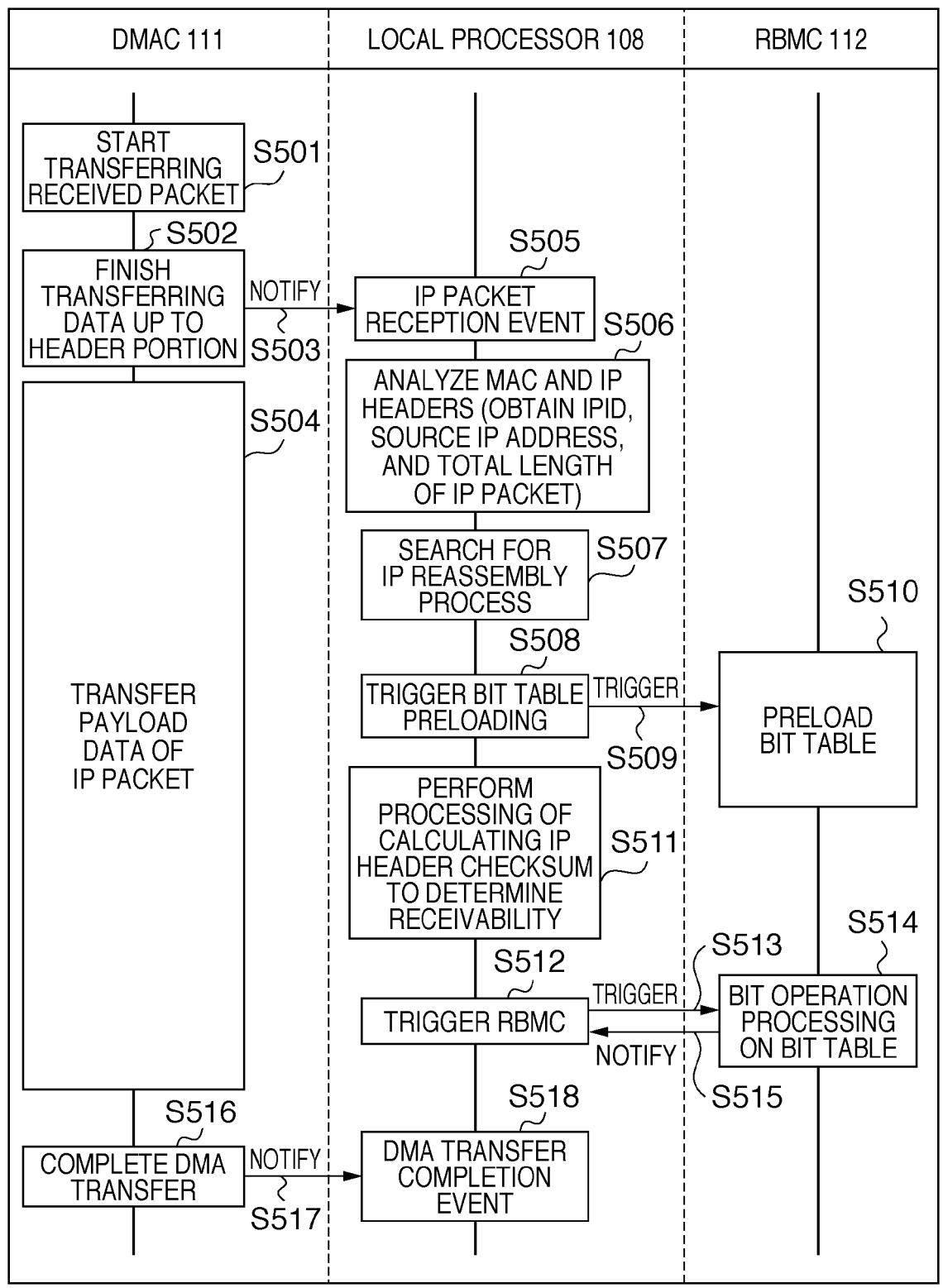
FIG. 5 is a diagram showing a temporal processing sequence for a DMAC 111, the RBMC 112, and a local processor 108 in the IP reassembly.

Next, a general processing flow of the IP reassembly performed in the IP protocol processing apparatus 105 will be described with reference to FIG. 5. FIG. 5 is a diagram showing a temporal processing sequence for the DMAC 111, the RBMC 112, and the local processor 108 in the IP reassembly. The example shown in FIG. 5 is a sequence assuming that a received IP packet is a fragment packet.

When the communication control unit 116 receives an IP packet, the DMAC 111 first starts transferring the received IP packet in S501, where the IP packet is transferred from the communication control unit 116 to the RAM 104. Data of a size corresponding to the portion from the beginning to the IP header of the received IP packet is transferred to the RAM 104 and also to the local RAM 110 at the same time. Once the IP packet of the data size corresponding to the initial portion including the MAC header (a header in the link layer) and the IP header has been transferred in S502, the DMAC 111 provides a reception notification (S503) to the local processor 108. Further, after providing the notification, the DMAC 111 continues transferring the payload portion to the RAM 104 in S504.

The local processor 108, having received the notification from the DMAC 111 in S505, starts IP packet reception processing. That is, the local processor 108 starts the IP packet reception processing without waiting until the entire received IP packet is transferred to the RAM 104. First, in S506, the local processor 108 analyzes the content of the MAC header and the IP header transferred to the local RAM 110. Here, it is checked whether a destination MAC address and a destination IP address are valid for reception. Further, in S506, the local processor 108 determines whether the packet is a fragment packet based on the content of the IP packet header. The format of the IP packet header will be described later.

If it is determined in S506 that the packet is a fragment packet, the local processor 108 performs processing of searching for a reassembly ID of an IP reassembly process for the received fragment packet in S507. Then, in S508, the local processor 108 triggers (S509) the RBMC 112 to preload a bit table corresponding to the reassembly ID found in S507. This preloading is processing of temporarily storing, in the internal memory 203 of the RBMC 112, bit table data to be processed.

In response to the trigger instruction, in S510, the RBMC 112 checks whether the bit table corresponding to the reassembly ID is stored in the internal memory 203. If not stored, the RBMC 112 temporarily stores the bit table kept in the RAM 104. That is, in S510, the bit table data is transferred between the RAM 104 and the internal memory 203.

The local processor 108, after triggering the preloading by the RBMC 112, verifies an IP header checksum of the received IP packet (i.e., the fragment packet) in S511 without waiting until the preloading processing is completed. If the checksum of the IP header is correct, the content of the IP header is correct. Therefore, it is determined that the IP packet is receivable.

Next, in S512, the local processor 108 triggers (S513) the RBMC 112 to perform the bit operation processing on the bit table. The local processor 108 then waits for the completion of the bit operation processing in S514.

In response to the trigger instruction, in S514, the RBMC 112 performs the bit operation processing on the bit table data temporarily stored in the internal memory 203. The RBMC 112 sets, in the register 201, the data size corresponding to the number of bits that have their bit values changed from 0 to 1 in this processing, that is, the newly received fragment size. The RBMC 112 then provides a processing completion notification (S515).

When the local processor 108 receives the notification, it can obtain the size of the fragment data newly received in the IP reassembly processing.

Once the DMAC 111 has transferred the entire received IP packet to the RAM 104 in step S516, the DMAC 111 provides a transfer completion notification to the local processor 108 (S517). The local processor 108 receives the DMA transfer completion notification in S518 and finishes this IP packet reception processing.

Thus, the general processing flow of the IP reassembly performed in the IP protocol processing apparatus 105 has been described.

In the first embodiment, the IP header checksum is verified in S511 to determine whether the received IP packet is receivable. However, the RBMC 112 does not store the bit table data in the internal memory 203 when the stage of the bit operation processing on the bit table for the IP reassembly process is reached in S514 after the determination. Rather, the RBMC 112 is triggered to perform the bit table preloading at the preceding stage in S508. That is, while the local processor 108 is verifying the IP header checksum in S511, the RBMC 112 performs the preloading processing in S510.

According to such a processing sequence, the IP packet reception processing by the local processor 108 and the preloading processing by the RBMC 112 are performed in parallel. Thus, even if data transfer occurs between the internal memory 203 and the RAM 104 when the RBMC 112 temporarily stores the bit table data in the internal memory 203, the temporal overhead can be ignored.

If it is determined that the IP packet is receivable as a result of S511, the IP reassembly is performed in S512. Since the bit table data is already stored in the internal memory 203, the bit operation processing in S514 is performed at a high speed. Even if it is determined that the IP packet is not receivable in S511, it is obvious that the state of the bit table has not been changed because the bit table data is only stored in the internal memory 203 in S510.

Next, the processing by the local processor 108 performed in S506 to S508 in the above-described IP reassembly processing sequence will be described in detail with reference to FIGS. 6 and 7.

Figure 6:
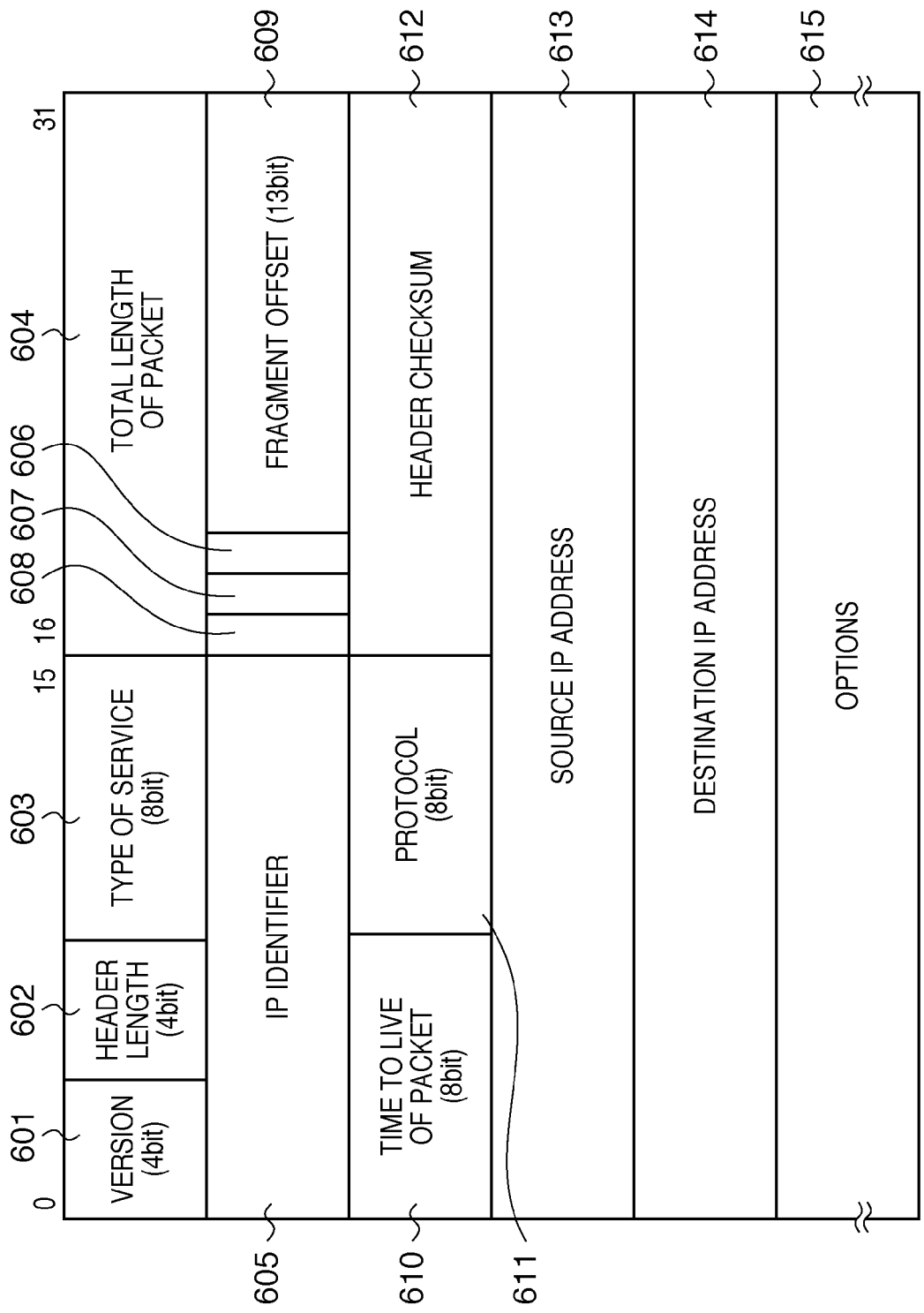
FIG. 6 is a diagram showing a format of an IP header in an IPv4 (IP version 4) packet.

FIG. 6 is a diagram showing a format of an IP header in an IPv4 (IP version 4) packet. Whether or not the IP packet is a fragment packet is determined from a more-fragments flag 606 and a fragment offset 609. If the more-fragments flag 606 is set to 1, it indicates that this IP packet is a fragment packet and another IP packet carrying subsequent fragment data further exists.

If the more-fragments flag 606 is set to 0 but the fragment offset 609 is not set to 0, this IP packet is a fragment packet carrying the last portion of the fragment data. By such a determination method, it is determined whether the received IP packet is a fragment packet.

Fragment packets that constitute the same fragmented original packet must have the same values for four fields in the IP header: an IP identifier 605, a protocol 611, a source IP address 613, and a destination IP address 614.

In the first embodiment, these four parameters are associated with a reassembly ID for identifying an IP reassembly process, and search entry data is stored in the CAM 114. This search entry data is stored when a new IP reassembly process is started and a new reassembly ID is determined. The processing of searching for an IP reassembly process upon reception of a fragment packet includes searching the CAM 114 for a reassembly ID by using the four fields obtained from the IP header as search keys. If the reassembly ID is not found as a result of this search, a new IP reassembly process is started and a new IP reassembly ID is determined.

Figure 7:
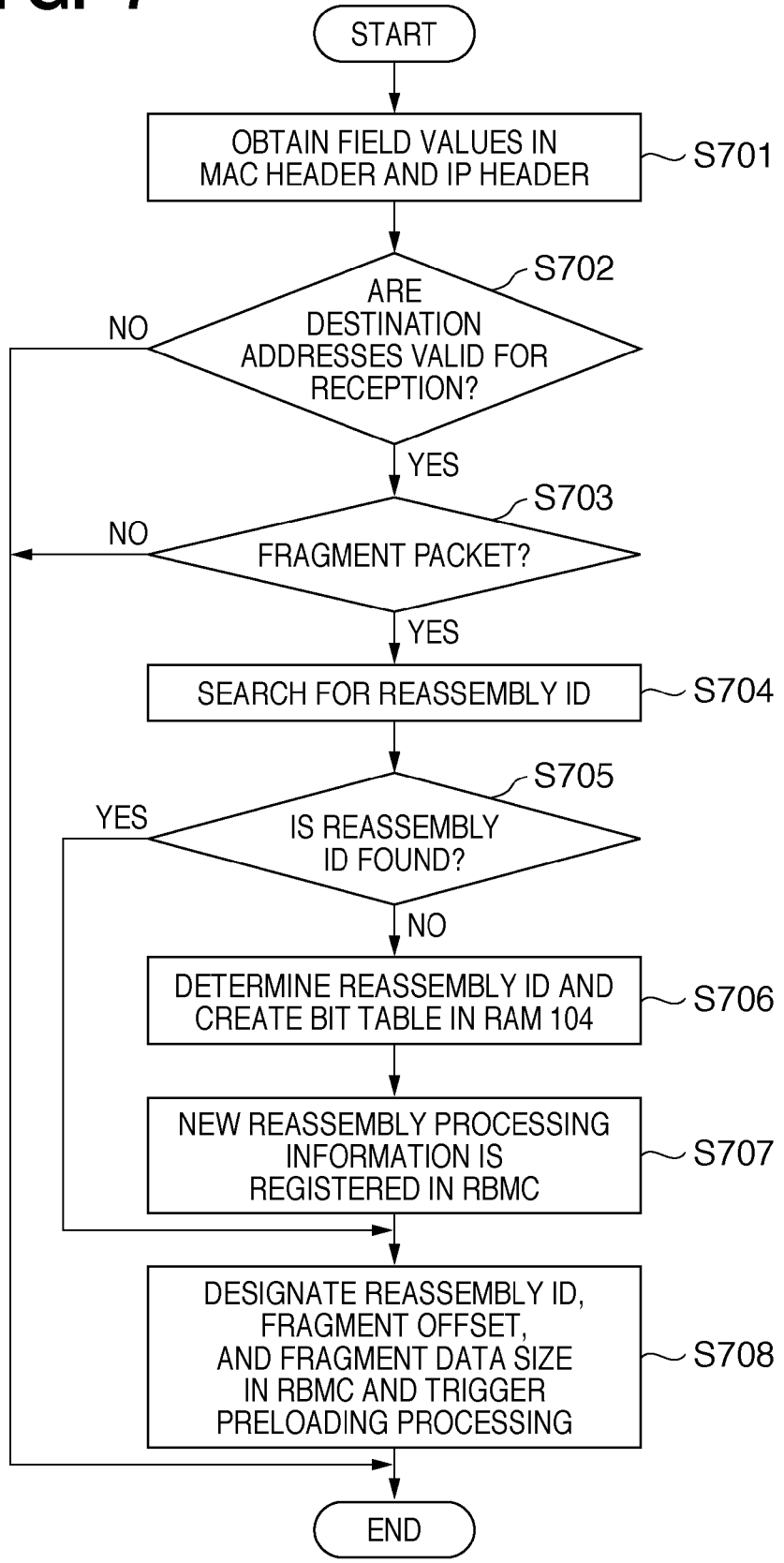
FIG. 7 is a flowchart showing processing (S505 to S508 in FIG. 5) by the local processor 108.

FIG. 7 is a flowchart showing the processing (S506 to S508 in FIG. 5) by the local processor 108.

First, in S701, various parameters in the MAC header and the IP header of the received IP packet are read out and obtained. Next, in S702, it is determined whether the destination MAC address and the destination IP address are valid for reception. If it is determined that these addresses are not valid for reception, the received packet is discarded and this processing terminates.

If the destination MAC address and the destination IP address are both valid for reception, the processing proceeds to S703. In this S703, it is checked whether or not this IP packet is a fragment packet based on the values of the more-fragments flag 606 and the fragment offset 609 in the IP header obtained in S701. If the IP packet is not a fragment packet, the IP reassembly is not performed but normal IP packet reception processing is performed.

However, if it is determined in S703 that the IP packet is a fragment packet, the processing proceeds to S704, where the search processing is performed for obtaining the reassembly ID for the fragment packet. This search processing is as described above and therefore will not be described.

Then, in S705, it is determined whether or not the reassembly ID can be found. If the reassembly ID cannot be found, the processing proceeds to S706. In this S706, since a new IP reassembly process needs to be started for this fragment packet, a new reassembly ID is determined. The new reassembly ID is associated with the four values of the IP identifier, the protocol, the source IP address, and the destination IP address of the packet, and a search entry is registered in the CAM 114. Further, a bit table corresponding to the new reassembly ID is created in the RAM 104.

In S707 that follows, the reassembly ID newly determined in S706 and the memory address of the bit table provided in the RAM 104 are set in the register 201 of the RBMC 112. At this point, the resource management unit 202 of the RBMC 112 generates bit table management information about the new IP reassembly process in the local RAM 110.

If the reassembly ID can be found in S705 or if the processing in S707 is finished, the processing proceeds to S708. In this S708, the reassembly ID, the fragment offset 609 obtained from the IP header, and the fragment data size, that is, the length of the payload of the IP packet, are set in the register 201 of the RBMC 112. Then, the preloading processing is triggered.

Next, the bit table preloading processing by the RBMC 112 performed in S510 in the above-described IP reassembly processing sequence will be described with reference to FIG. 8.

Figure 8:
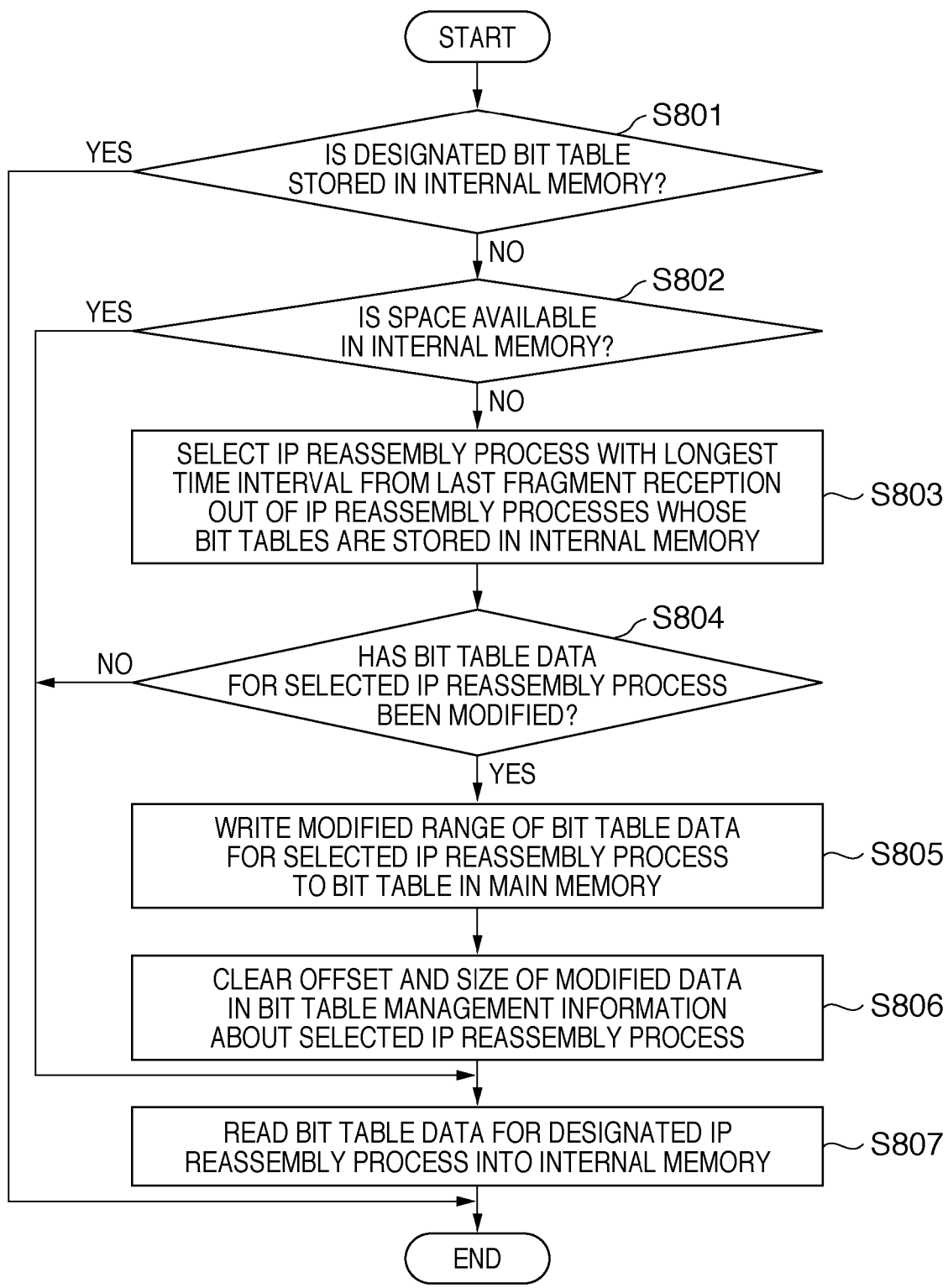
FIG. 8 is a flowchart showing bit table preloading processing.

FIG. 8 is a flowchart showing the bit table preloading processing. First, in S801, it is checked whether the bit table corresponding to the reassembly ID designated in the register 201 is temporarily stored in the internal memory 203. If the bit table is stored in the internal memory 203, this processing terminates.

If the bit table corresponding to the designated reassembly ID is not stored in the internal memory 203, the processing proceeds to S802, where it is checked whether or not a space for storing the bit table is available in the internal memory 203. If available, the processing proceeds to S807. If not available, the processing proceeds to S803.

In S803, for the IP reassembly processes whose bit tables are stored in the internal memory 203, the time intervals from the last processing in which the processes were processed last are compared to select an IP reassembly process with the longest time interval. Here, the bit table management information 70 maintained by the resource management unit 202 for each IP reassembly ID is referred to. In bit table management information having the internal memory storage flag 705 being set ON, the values of the time interval 703 from the last processed IP reassembly are compared. That is, a reassembly ID with the largest value of the arrival interval 703 in the bit table management information 70 is selected.

Next, in S804, it is checked whether the bit table in the internal memory 203 for the selected reassembly ID has been modified. Here, it is checked whether the internal memory data modification flag 708 is ON in the bit table management information 70 for the selected reassembly ID. If the bit table has been modified, the processing proceeds to S805. Otherwise, the processing proceeds to S807.

In S805, processing is performed in which only the modified range in the bit table in the internal memory 203 for the selected reassembly ID is written back to the bit table in the RAM 104. In the bit operation processing, the RBMC 112 updates the data modification offset address 709 and the data modification size 710 in the bit table management information 70. Therefore, the modified portion of the bit table that needs to be written back is the range of the size 710 starting at the offset address 709. Here, only the modified portion of the bit table in the internal memory 203 is written to the bit table in the RAM 104 to reflect the modified portion.

Next, in S806, all the fields from 705 to 710 are cleared in the management information 70 about the bit table written back to the RAM 104, and the processing proceeds to S807.

In this S807, the bit table data for the designated reassembly ID is read into the internal memory 203. The bit table data is read into the available space found in S802, or into where the bit table for the reassembly ID selected in S803 has been located in the internal memory 203.

In S807, bit table data in the range corresponding to the fragment offset and the fragment data size that are set in the register 201 is given the priority to be transferred first to the internal memory 203. Bit table data other than this portion is transferred later. This is for allowing the bit operation processing to be performed immediately if the bit operation processing is started before the entire bit table is transferred to the internal memory 203. Thus, the bit table preloading processing is performed in the above manner.

Next, the bit operation processing on the bit table by the RBMC 112 performed in S514 in the above-described IP reassembly processing sequence will be described with reference to FIG. 9.

Figure 9:
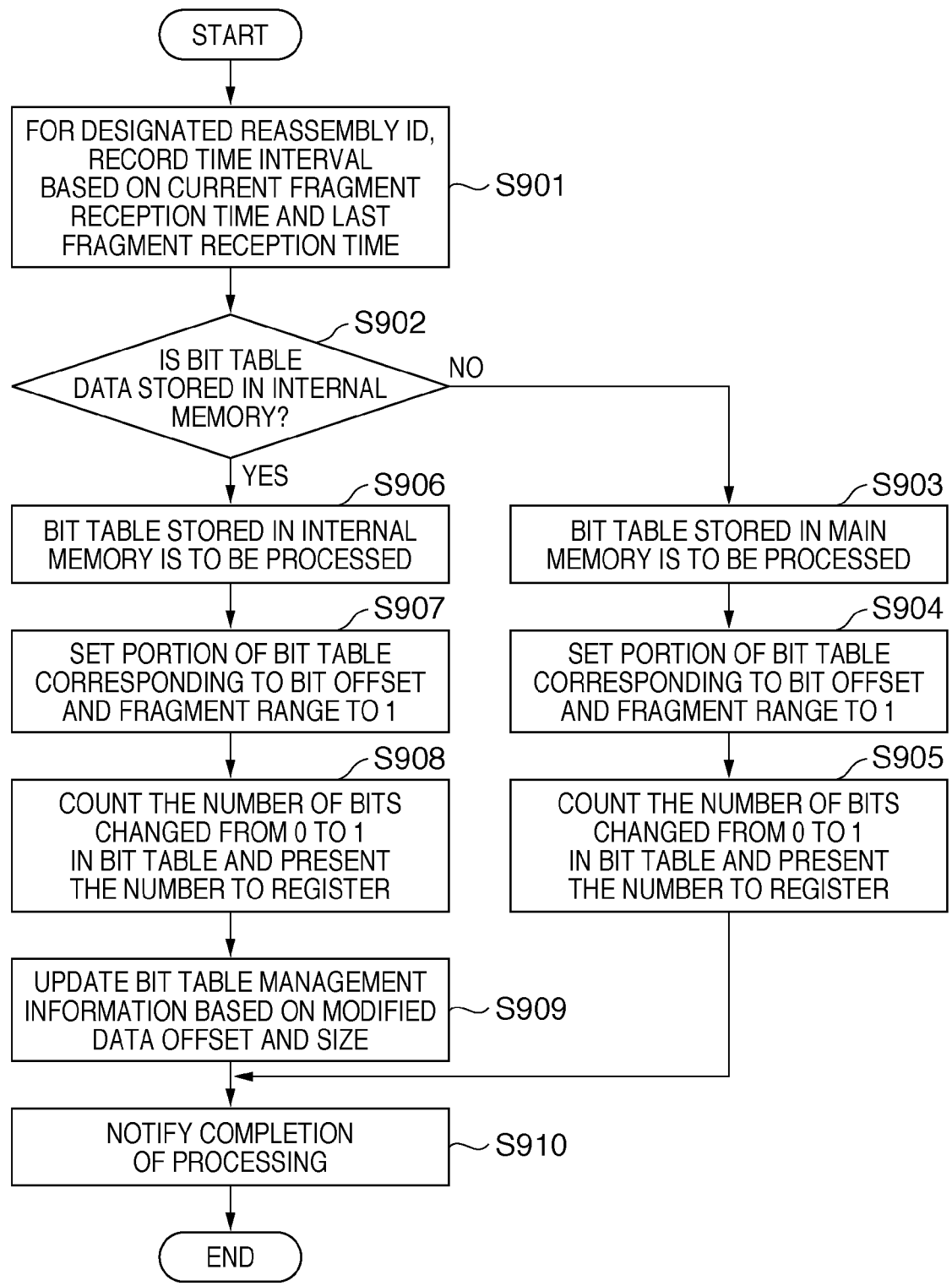
FIG. 9 is a flowchart showing the bit operation processing on the bit table.

FIG. 9 is a flowchart showing the bit operation processing on the bit table. First, in S901, a current timer value is obtained from the communication timer 113 to determine the current time. Also, the difference value between the current time and the processing time 702 of the last processed IP reassembly in the bit table management information for the designated reassembly ID is determined to obtain the time interval from the previously processed IP fragment packet. Then, the fields 702 and 703 in the management information are updated.

Next, in S902, it is checked whether the bit table for the designated reassembly ID is temporarily stored in the internal memory 203. Here, the resource management unit 202 of the RBMC 112 checks whether the internal memory storage flag 705 in the bit table management information for this reassembly ID is ON. If ON, the processing proceeds to S906. If OFF, the processing proceeds to S903. It is to be noted that the determination in S902 is unnecessary if it is ensured that the preloading processing by the RBMC 112 (S510) has been performed. In that case, the processing proceeds from S901 to S906.

In S903, the processing enters a processing mode in which bit operation is directly performed on the bit table in the RAM (main memory) 104. Next, in S904, the bit range in the bit table in the RAM 104 corresponding to the fragment offset and the fragment data size designated in the register 201 is set to 1. In S905, the number of bits changed from 0 to 1 in the bit table in the RAM 104 is set in the register 201, and the processing proceeds to S910.

On the other hand, in S906, the processing enters a processing mode in which bit operation is performed on the bit table data in the internal memory 203. Next, in S907, the bit range in the bit table in the internal memory 203 corresponding to the fragment offset and the fragment data size designated in the register 201 are set to 1. In S908, the number of bits changed from 0 to 1 in the bit table in the internal memory 203 is set in the register 201. Next, in S909, the data offset and the data size of the modified portion of the bit table in the internal memory 203 are recorded in 709 and 710 in the bit table management information, respectively. The processing proceeds to S910.

In this S910, the local processor 108 is notified of the completion of the bit operation processing, and this processing terminates.

In the case where the processing proceeds from S902 to S903, the bit operation processing is performed on the bit table in the RAM 104, which involves a large access delay. Therefore, the processing requires a longer time compared to the bit operation processing on the bit table in the internal memory 203 in the case where the processing proceeds from S902 to S906. However, since the preloading processing is performed by the RBMC 112 as in the above-described sequence shown in FIG. 5 or 8, the processing proceeds from S902 to S906 and the bit operation processing can be performed at a high speed.

According to this embodiment, in the IP reassembly procedure described in RFC 791, the RBMC 112 can perform the bit operation processing by temporarily storing the bit table in the internal memory 203 with a small access delay. Therefore, high-speed bit operation processing can be realized.

Also, the execution of the IP packet reception processing for the received fragment packet and the preloading processing by the RBMC 112 are performed in parallel, the temporal overhead for the RBMC 112 to store the bit table in the internal memory 203 can be ignored.

Further, in the preloading processing, if no space is available in the internal memory 203, control is performed so that a bit table for an IP reassembly process with a long temporal arrival interval of fragment packets is written back to the RAM 104. Therefore, bit tables with shorter arrival intervals of fragment packets, that is, with higher IP reassembly processing frequencies can be given higher priority to be stored in the internal memory 203. This allows reducing bit table data transfer between the RAM 104 and the internal memory 203.

Second Embodiment

Now, a second embodiment according to the present invention will be described in detail with reference to the drawings. The configuration of the IP protocol apparatus in the second embodiment is the same as in FIGS. 1 and 2 described in the first embodiment. That is, the IP protocol processing apparatus 105 shown in FIG. 1 and the internal configuration shown in FIG. 2 also apply, and the reassembly bitmap controller (RBMC) 112 has the same configuration as in the first embodiment.

In the first embodiment, the entire data of bit tables for some recently processed IP reassembly processes, out of all bit tables being processed in parallel to the internal memory 203 of the RBMC 112, is temporarily stored in the internal memory 203. However, in the second embodiment, only partial data of each of all bit tables kept in the RAM 104 is temporarily stored in the internal memory 203.

Figure 10:
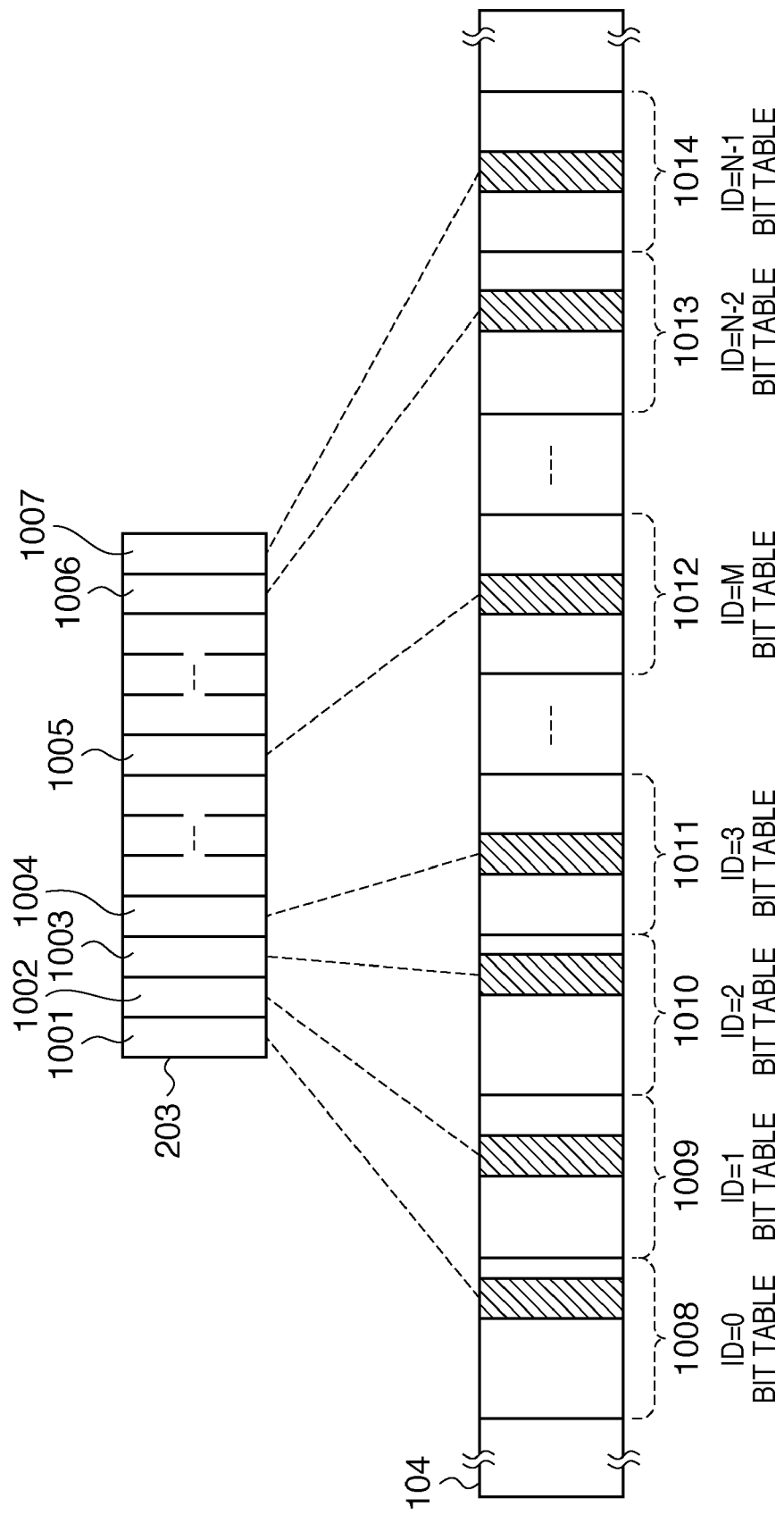
FIG. 10 is a diagram showing that only partial data of all bit tables is stored in an internal memory 203.

FIG. 10 is a diagram showing that only partial data of all bit tables is stored in the internal memory 203. Reference numerals 1008 to 1014 represent that all bit tables for N IP assembly processes are kept in the RAM 104. Reference numerals 1001 to 1007 in the internal memory 203 represent only partial data of the bit tables 1008 to 1014 is stored therein.

In this example, partial data of the bit table 1008 whose reassembly ID is 0 is stored in 1001, and partial data of the bit table 1012 whose reassembly ID is M is stored in 1005.

Storage in the internal memory 203 employs the direct mapping approach. That is, in the internal memory 203, the storage location and size of the partial data of each bit table are fixedly defined, and the data stored in each storage location is limited to the range of 1 K-octet of each bit table kept in the RAM 104.

In such a storage method for the internal memory 203, it is possible to reduce the memory size required in the internal memory 203 by reducing the size of data to be stored. Also, the size of data stored in the internal memory 203 is set to the maximum size required for the IP reassembly of one fragment packet. This allows reducing the size of data transferred between the RAM 104 and the internal memory 203 in the preloading processing by the RBMC 112 compared with transferring the entire bit table.

The storage size in the internal memory 203 is determined based on the MTU value of the network to which the IP protocol processing apparatus 105 connects. For example, in the case of typical Ethernet®, the MTU is 1500. Therefore, the maximum length of a payload carried by one IP packet is 1480, which is 1500 minus the minimum size of an IP header.

Therefore, the maximum length of fragment data carried by one fragment packet is 1480, and required bit table data is 185 bits. That is, storing bit data of 24 bytes (192 bits) for each bit table provides a sufficient data size for the IP reassembly of one fragment packet.

In the first embodiment, the entire bit table is temporarily stored in the internal memory 203. Since the size required for one bit table is 1 Kbyte (8192 bits), about 40 times of bit tables can be temporarily stored.

However, in the first embodiment, if the bit table is already stored in the internal memory 203 in the preloading processing by the RBMC 112, bit table data does not need to be transferred from the RAM 104. That is, if the same IP reassembly process is continuously processed or if the execution frequency per unit time is high, the number of times of transferring bit table data is advantageously reduced.

In contrast, in the method of the second embodiment, data transfer from the RAM 104 to the internal memory 203 occurs in every IP reassembly unless fragment packets frequently contain overlapping fragment data.

However, the transfer size of the bit table data is small. In addition, as described above, the IP reassembly is performed in such a manner that the IP packet reception processing by the local processor 108 and the preloading processing by the RBMC 112 are performed in parallel.

Therefore, the temporal overhead of the bit table data transfer between the RAM 104 and the internal memory 203 can be ignored and does not lead to slowing down the IP reassembly processing.

Also, because of the number of concurrent IP reassembly processes that can be processed in parallel, the memory cost for the internal memory 203 with a small access delay can be reduced.

Third Embodiment

Next, a third embodiment according to the present invention will be described in detail with reference to the drawings. The configuration of the IP protocol apparatus in the third embodiment is the same as in FIG. 1 described in the first embodiment. That is, the internal configuration of the IP protocol processing apparatus 105 shown in FIG. 1 also applies. However, the internal configuration of the reassembly bitmap controller (RBMC) is different from that described in the first embodiment.

Figure 11:
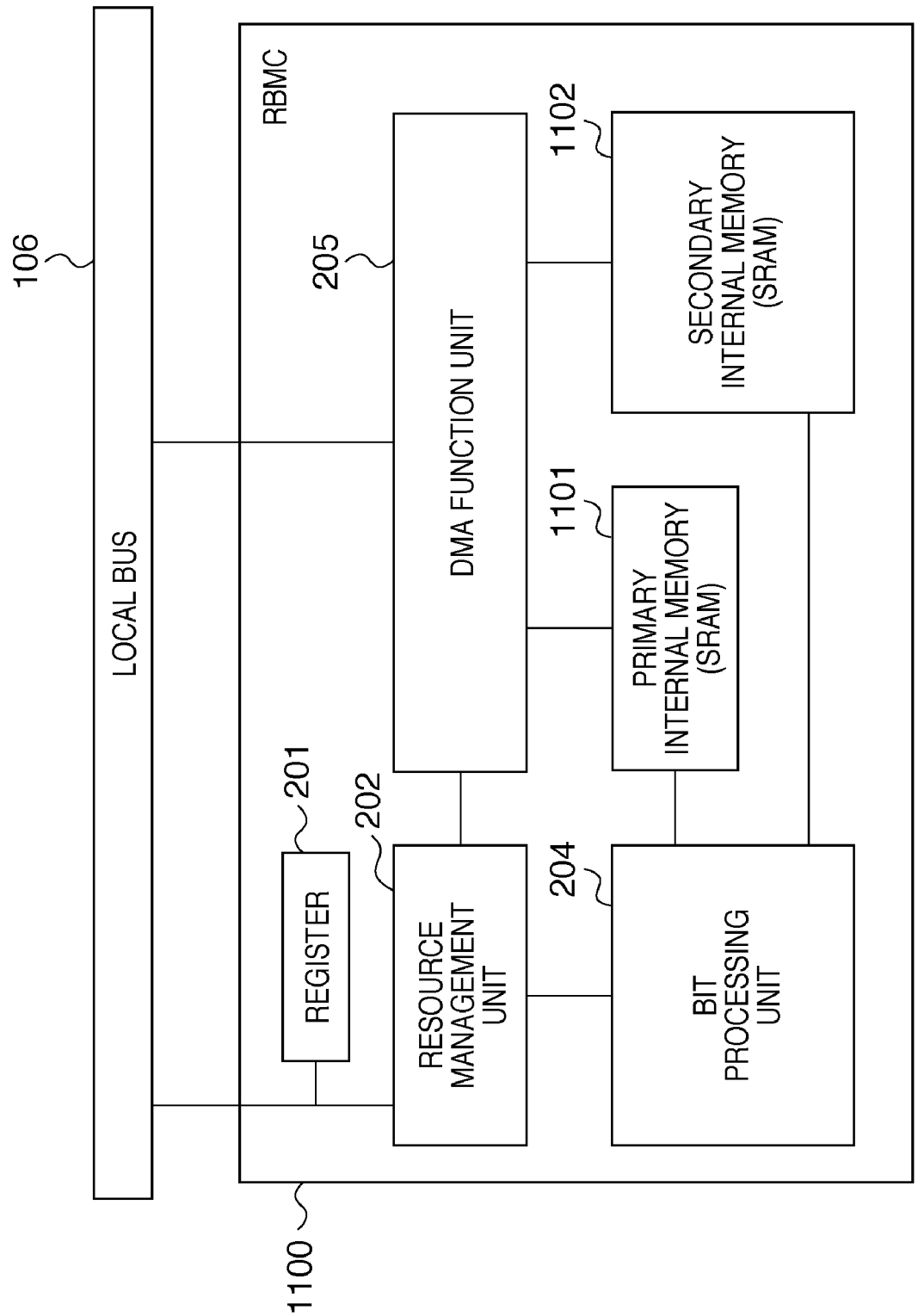
FIG. 11 is a diagram showing an exemplary configuration of the RBMC in a third embodiment.

FIG. 11 is a diagram showing an exemplary configuration of the RBMC in the third embodiment. Reference numeral 1100 denotes the RBMC in the third embodiment corresponding to the RBMC 112 shown in FIG. 2. The RBMC 1100 is composed of a register 201, a resource management unit 202, a primary internal memory 1101, a bit processing unit 204, a DMA function unit 205, and a secondary internal memory 1102. It is to be noted that elements similar to the ones in the configuration shown in FIG. 2 are given like numerals.

In the configuration of the RBMC 1100, what is different from the first embodiment is that the internal memory 203 is replaced with two elements: the primary internal memory 1101 and the secondary internal memory 1102.

Figure 12:
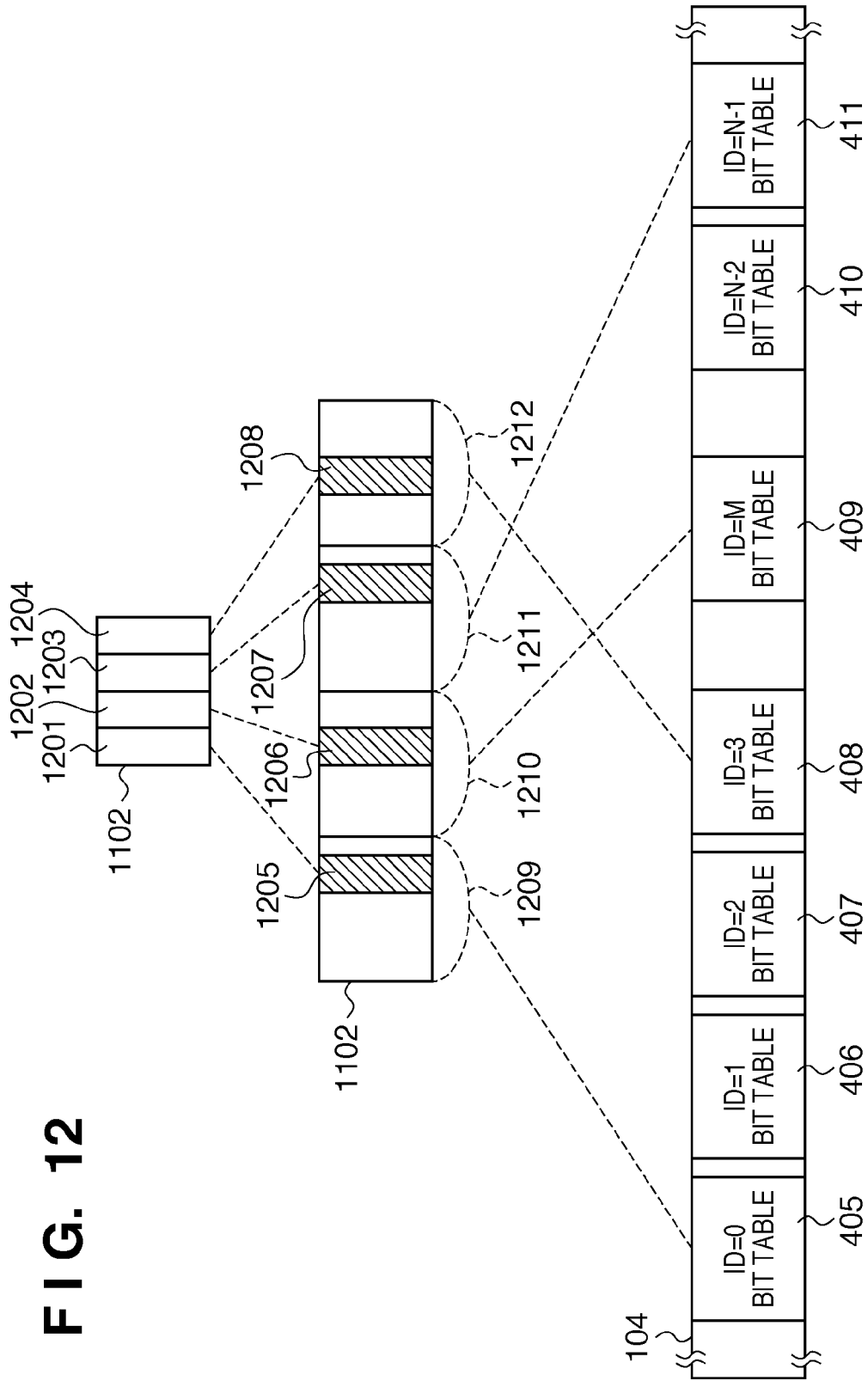
FIG. 12 is a diagram showing a method of storing bit table data in internal memory in the third embodiment.

FIG. 12 is a diagram showing the method of storing bit table data in the internal memory in the third embodiment. Bit tables 405 to 411 for all IP reassembly processes being processed in parallel are kept in the RAM 104. Out of the bit tables kept in any addresses in the RAM 104, four bit tables are temporarily stored in the secondary internal memory 1102. In the example shown in FIG. 12, four bit tables 405, 408, 409, and 411 with reassembly IDs 0, 3, M, and N-1 are stored at locations 1209 to 1212 in the secondary internal memory 1102. Further, partial data 1205 to 1208 of each bit table temporarily stored in the secondary internal memory 1102 is stored at 1201 to 1204 in the primary internal memory 1101.

This storage in the primary internal memory 1101 employs the direct mapping approach with respect to the secondary internal memory 1102.

The storage in the secondary internal memory 1102 employs the full associative approach on a bit table size basis with respect to the bit tables placed in any addresses in the RAM 104.

In such a configuration of the RBMC 1100 and bit table data storage method, a bit table with a shorter arrival interval of fragment packets and therefore with a larger number of times of IP reassembly processing per unit time is given higher priority to be stored in the secondary internal memory 1102. In this manner, bit table data transfer to the RAM 104 can be reduced.

Further, since only the partial data of the bit tables is transferred between the primary internal memory 1101 and the secondary internal memory 1102, the data transfer overhead can be minimized.

The primary internal memory 1101 and the secondary internal memory 1102 can perform high-speed data transfer inside the RBMC 1100. Therefore, data synchronization control between the primary memory and the secondary memory is simplified by write through control, in which data is written by the bit operation processing to the primary internal memory 1101 while the data is written to the secondary internal memory 1102 at the same time.

Further, if a bit table to be processed in the IP reassembly does not exist in the second internal memory 1102, only data of the range to be processed is directly transferred from the RAM 104 to the primary internal memory 1101 to speed up the preloading processing. In this preloading processing, the data in the primary internal memory 1101 does not need to be written back in the case where the above-mentioned write through control is performed.

Thus, when a plurality of IP reassembly processes are performed in parallel in the IP reassembly according to the bitmap table scheme, speedup of the bit operation processing and reduction of the capacity required for memory is possible by placing bit tables in memory with a small access delay. The present invention is suitable for communication terminal apparatuses that performs high-speed IP protocol communications and for TOE.

According to the above-described embodiments, the bit operation processing on bit tables are performed on data kept in second storage unit with a small access delay. This allows speedup of the IP reassembly.

Also, bit tables for all IP reassembly processes being processed are placed in first storage unit, and only data of bit tables subjected to the bit operation is placed in the second storage unit with a small access delay. This allows reducing the storage capacity required for the second storage unit. For example, SDRAM may be used for the first storage unit and SRAM may be used for the second storage unit, so that SRAM generally involving a high memory cost may be implemented with a small capacity and SDRAM involving a low memory cost may be implemented with a large capacity capable of storing at least all the bit tables. This allows reduction of the memory cost. That is, the number of IP reassembly processes processible in parallel can be increased at a low memory cost.

Further, the data of the bit tables subjected to the bit operation processing is prepared in the second storage unit before starting the processing. Bit table data for IP reassembly processes with shorter arrival intervals of fragment packets is given higher priority to be stored in the second storage unit. This allows the temporal overhead of data transfer occurring between the first storage unit and the second storage unit to be reduced on the average, thereby allowing high-speed IP reassembly processing.

The present invention may be applied to a system composed of a plurality of devices (for example, a host computer, interfacing device, reader, printer, etc.), or to an apparatus implemented as a single device (for example, a copier, facsimile device, etc.).

In other embodiments, objects of the present invention may be achieved in such a manner that a recording medium having recorded thereon a program code of software implementing the functions of the above-described embodiments is supplied to the system or apparatus, and a computer (a CPU or MPU) of the system or apparatus reads out and executes the program code stored in the recording medium.

In this case, the program code itself read out from the computer-readable recording medium implements the functions of the above-described embodiments, so that the recording medium having stored thereon the program code constitutes the present invention.

The recording medium for supplying the program code may be a flexible disk, hard disk, optical disk, magneto-optical disk, CD-ROM, CD-R, magnetic tape, nonvolatile memory card, or ROM, for example.

Besides the case where the computer executes the read-out program code to implement the functions of the above-described embodiments, the case is also included where an OS (operating system) or the like running on the computer performs part or all of actual processing under instructions of the program code to implement the functions of the above-described embodiments.

Further, the case is also included where the program code read out from the recording medium is written to memory provided in a function extension board inserted into the computer or in a function extension unit connected to the computer, and then a CPU or the like provided in the function extension board or function extension unit performs part or all of actual processing under instructions of the program code to implement the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-058703, filed Mar. 7, 2008, which is hereby incorporated by reference herein in its entirety.

What is claimed is:

1. A processing apparatus that processes received Internet Protocol (IP) packets, the apparatus comprising:
a controller configured to control a first storage; and
a processor configured to perform processing for determining whether a header of an IP packet has been properly received while data indicating a reception state of fragmented IP packets is transferred from a second storage to the first storage, and instruct the controller to update data stored in the first storage in accordance with a result of the processing for determining whether the header of the IP packet has been properly received,
wherein the processor notifies the controller of an identifier of the received IP packet, and performs the processing for determining whether the header of the IP packet has been properly received while data identified by the controller as not being stored in the first storage is transferred from the second storage to the first storage.

2. The apparatus according to claim 1, wherein the processor performs the processing for determining whether the header of the IP packet has been properly received while the controller transfers the data indicating the reception state of the received IP packet from the second storage to the first storage.

3. The apparatus according to claim 1, wherein the controller transfers the data from the second storage to the first storage in an order according to a location of the fragmented IP packets in a packet before being fragmented.

4. The apparatus according to claim 1, wherein the processor instructs the controller to update the data stored in the first storage such that data indicating properly received IP packets among the fragmented IP packets is stored.

5. A processing method for processing received Internet Protocol (IP) packets, the method comprising:
performing, at a processor, processing for determining whether a header of an IP packet has been properly received while data indicating a reception state of fragmented IP packets is transferred from a second memory to a first memory;
updating, at a controller, the data stored in the first memory in accordance with a result of the processing for determining whether the header of the IP packet has been properly received; and
notifying, at the processor, the controller of an identifier of the received IP packet,
wherein the processing for determining whether the header of the IP packet has been properly received is performed while data identified by the controller as not being stored in the first memory is transferred from the second memory to the first memory.

6. The method according to claim 5, wherein the processing for determining whether the header of the IP packet has been properly received is performed while the data indicating the reception state of received IP packets is transferred from the second memory to the first memory.

7. The method according to claim 5, wherein the data is transferred from the second memory to the first memory in an order according to a location of the fragmented IP packets in a packet before being fragmented.

8. The method according to claim 5, wherein data indicating properly received IP packets among the fragmented IP packets is stored and updated in the first memory.

* * * * *